United States Patent
Miseiko et al.

(10) Patent No.: US 11,316,885 B1
(45) Date of Patent: Apr. 26, 2022

(54) SELF-LEARNING DATA COLLECTION OF MACHINE CHARACTERISTICS

(71) Applicant: Rapid7, Inc., Boston, MA (US)

(72) Inventors: Paul-Andrew Joseph Miseiko, Mississauga (CA); Ross Barrett, York (CA)

(73) Assignee: Rapid7, Inc., Boston, MA (US)

( * ) Notice: Subject to any disclaimer, the term of this patent is extended or adjusted under 35 U.S.C. 154(b) by 244 days.

(21) Appl. No.: 16/669,188

(22) Filed: Oct. 30, 2019

(51) Int. Cl.
    *H04L 29/06* (2006.01)
(52) U.S. Cl.
    CPC ........ *H04L 63/1433* (2013.01); *H04L 63/145* (2013.01)
(58) Field of Classification Search
    CPC ... H04L 63/1433; H04L 63/145; H04L 63/20; H04L 63/1416; H04L 63/1441; H04L 63/1408; H04L 63/14; H04L 63/1425; H04L 2463/144; H04L 41/147; G06F 21/577; G06F 2221/034; G06F 21/554; G06F 11/3604; G06F 11/3058
    See application file for complete search history.

(56) References Cited

U.S. PATENT DOCUMENTS

| | | | |
|---|---|---|---|
| 7,609,650 B2 | 10/2009 | Roskowski et al. | |
| 8,955,038 B2 | 2/2015 | Nicodemus et al. | |
| 9,166,999 B1* | 10/2015 | Kulkarni | ............ H04L 63/1433 |
| 9,503,472 B2 | 11/2016 | Laidlaw et al. | |
| 9,634,951 B1 | 4/2017 | Hunt et al. | |
| 2005/0076066 A1* | 4/2005 | Stakutis | .................. G06F 16/10 |
| 2006/0023638 A1* | 2/2006 | Monaco | ............. H04L 43/0817 |
| | | | 370/252 |
| 2006/0085852 A1* | 4/2006 | Sima | .................... H04L 63/1433 |
| | | | 726/22 |
| 2007/0143471 A1* | 6/2007 | Hicks | .................. H04L 41/0869 |
| | | | 709/224 |
| 2008/0059214 A1* | 3/2008 | Vinberg | ............. G06F 21/6236 |
| | | | 709/221 |
| 2010/0115582 A1* | 5/2010 | Sapp | .................... H04L 41/0806 |
| | | | 726/1 |
| 2015/0095587 A1* | 4/2015 | Xu | ........................ G06F 12/126 |
| | | | 711/136 |
| 2016/0044057 A1 | 2/2016 | Chenette et al. | |

(Continued)

*Primary Examiner* — Ali S Abyaneh
(74) *Attorney, Agent, or Firm* — Robert C. Kowert; Kowert, Hood, Munyon, Rankin & Goetzel, P.C.

(57) ABSTRACT

Systems and methods are disclosed to implement a self-learning machine assessment system that automatically tunes what data is collected from remote machines. In embodiments, agents are deployed on remote machines to collect machine characteristics data according to collection rule sets, and to report the collected data to the machine assessment system. The machine assessment system assesses the remote machines using the collected data, and automatically determines, based on what data was or was not needed during the assessment, whether an agent's collection rule set should be changed. Any determined changes are sent back to the agent, causing the agent to update its scope of collection. The auto-tuning process may continue over multiple iterations until the agent's collection scope is stabilized. In embodiments, the assessment process may be used to analyze the remote machine to determine security vulnerabilities, and recommend possible actions to take to mitigate the vulnerabilities.

18 Claims, 9 Drawing Sheets

(56) References Cited

U.S. PATENT DOCUMENTS

| | | | |
|---|---|---|---|
| 2017/0149808 A1* | 5/2017 | Hamada | H04L 63/0209 |
| 2017/0339178 A1* | 11/2017 | Mahaffey | G06F 11/3452 |
| 2018/0367560 A1* | 12/2018 | Mahaffey | H04W 12/128 |
| 2020/0342106 A1* | 10/2020 | Chelarescu | G06F 11/1458 |

* cited by examiner

SELF-LEARNING DATA COLLECTION OF MACHINE CHARACTERISTICS

BACKGROUND

Many companies operate private computer networks that are connected to public networks such as the Internet. While such connections allow company users to easily access resources on the public networks, they also create vulnerabilities in the company network. For example, company users may unwittingly download malicious content (e.g. data, files, applications, programs, etc.) onto the company network from untrusted sources on the Internet. As another example, interactions of company users with the public network may provide opportunities for malicious actors to attack the company network. A malicious actor can plant spyware, viruses, or other types of malicious software in a company's private network though a variety of interactive means, in order to steal sensitive information from the company or even gain control of the company's computing systems. As a result, enterprise security systems have become increasingly important to protect company networks against these types of vulnerabilities.

Some enterprise security systems operate by periodically collecting data from computing resources in the company network, in order to monitor these resources. Unfortunately, large scale configuration and management of these data collections continues to present significant challenges. Typically, data collection requirements for a resource does not remain static over time. For example, additional data may be needed for a particular machine to perform a more specific assessment of that machine, based on the results of an earlier assessment. It is generally difficult to know in advance what data is needed from a machine to perform an ongoing comprehensive assessment of that machine. Over-collection of data from the machine is undesirable as it places excessive strain on the collection pipeline. On the other hand, under-collection of data is also undesirable since it prevents the assessment system from properly monitoring the machine. There is a general need in the field to improve the management of data collection in enterprise security systems.

SUMMARY OF EMBODIMENTS

The systems and methods described herein may be employed in various combinations and in embodiments to implement a machine assessment system that performs self-learning to automatically tune what data is collected from remote machines in order to perform assessments of the remote machines. In embodiments, machine characteristics data about a remote machine is collected by an agent deployed on the remote machine, which collects data according to a collection rule set. The agent reports the collected data to the machine assessment system, which in turn uses the data to perform assessments on the remote machine. In embodiments, the machine assessment system is configured to automatically determine, based on what data was or was not needed during the assessments, whether an agent's collection rule set needs to be changed. The determined changes are sent back to the agent, causing the agent to update its collection rule set for subsequent collections. The self-learning process may continue over multiple iterations until the agent's collection scope is stabilized. In embodiments, the assessment process may be used to analyze the remote machine for security vulnerabilities, and recommend possible actions to take to mitigate any detected vulnerabilities.

Figure 1:
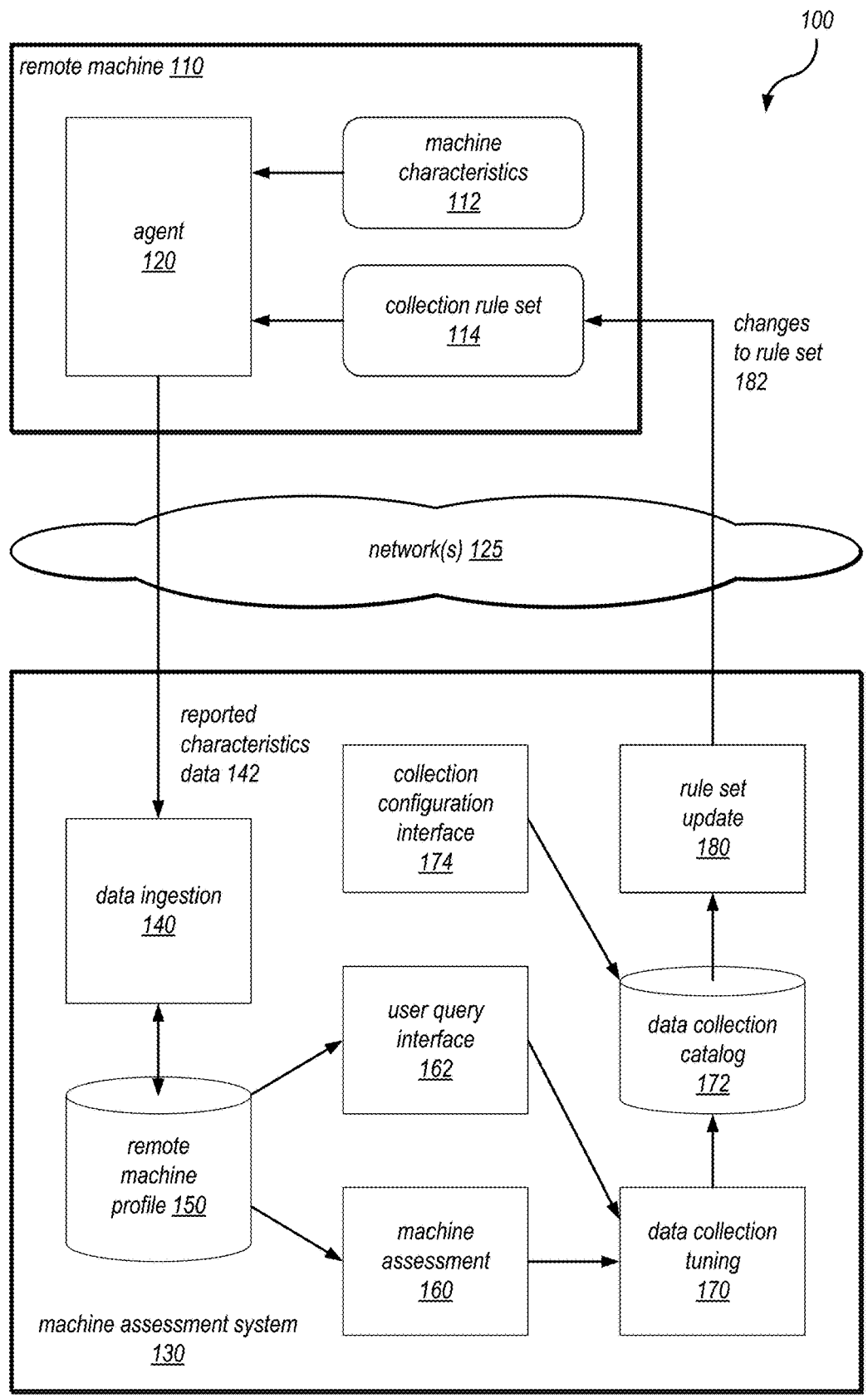
FIG. 1 is a block diagram illustrating an example machine assessment system that implements self-learning data collection of machine characteristics, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Enterprise security systems may periodically collect data from the computing resources in a company network in order to observe and assess these resources. However, the proper configuration and management of these data collections poses significant challenges for system administrators. One difficulty relates to the large number of changes to data collection requirements over time. For example, additional data may be needed from a particular machine to perform a more specific assessment of the machine, based on the results of an earlier assessment. It is generally difficult to know in advance what data is needed from a machine to maintain an ongoing comprehensive assessment of that machine. These challenges are compounded in cases where the data collections must be configured separately for individual resources, making the management of data collection changes a time-consuming and error prone task for system administrators.

Accordingly, embodiments of a machine assessment system are disclosed herein that implement a self-learning data collection process, where the system automatically adjusts the scope of data collection based on usage of the collected data during the assessment process. In some embodiments, an agent installed in the company network (e.g. on an individual machine in the company network) is configured to collect machine characteristics data (e.g. file listings, machine properties, registry entries) from the machine. The agent maintains a set of collection instructions (e.g. a collection rule set) that specifies what machine characteristics the agent will to collect and report back to the machine assessment system.

In some embodiments, the machine assessment system may be implemented as a network-accessible service that is configured to perform a variety of security vulnerability assessments of large numbers of machines based on machine characteristics data collected by their respective agents. The machine assessment service implements a self-learning architecture, so that the assessment service becomes aware of what data it needs to assess each individual machine. In some embodiments, the assessment process may generate output indicating what additional machine characteristics are needed for the assessment, and what collected machine characteristics data are not needed for the assessment. The output is stored in a data collection catalog for the machine, and any changes in the data collection catalog are sent to the agent, causing the agent to change its collection rule set and data collection scope.

This collection rule set tuning process may continue as a feedback loop over a number of iterations, during which the assessment service gains more knowledge about a machine over successive assessments, and gradually tunes the collection rule set of the agent to focus on the machine characteristics needed for further assessments. After some number of iterations, the self-learning process may arrive at a stabilization point where the assessment system ceases to generate further changes collection rule set. In some embodiments, further detected changes (e.g. the installation of a new application on the machine) will cause the self-learning process to readjust the agent's collection scope.

Advantageously, the disclosed self-learning process is designed to occur automatically between the machine assessment service and the data collection agent, without the need for any human intervention or re-release of the agent. This automatic tuning of the agent by the assessment service relieves human administrators from having to manually monitor and update the collection behavior of individual agents.

In another respect, the self-learning process allows the assessment service to discover the optimal collection scope for each machine, allowing the assessment service to arrive at a minimal set of machine characteristics that is needed to the assessments, so that no unnecessary data is collected or reported. Accordingly, the self-learning process reduces resource utilization of the system (e.g. reduced processing and storage footprint of the agent and the assessment service and reduced network bandwidth for the collections) and increases security of the system (e.g. reduced traffic sent over the public network).

In another respect, the self-learning process allows the assessment service to automatically adjust the scope of data collections in response to detected changes on the remote machine. For example, in some embodiments, the assessment system may detect from a routine assessment that a new application has been installed on the machine, and in response, immediately expand data collection to gather additional information about the installed application. In this manner, the assessment service is able provide dynamic monitoring of the machine, based on the changing conditions of the machine. The dynamic configuration change can occur without the need for any human intervention, allowing the assessment service to detect and respond to new vulnerabilities more quickly.

In some embodiments, the assessment service and the agent may implement a synchronization protocol to periodically synchronize the agent's collection rule set with a master copy of the collection rule set maintained by the assessment system. The synchronization may occur via a pull mechanism by the agent (e.g. where the agent polls for changes from the assessment system), so that any new changes can be downloaded at a time that is convenient for the agent. In some embodiments, the synchronization protocol may implement versioning of changes, so that only a delta of changes between two versions needs to be sent to the agent, to further reduce network usage.

In some embodiments, the agent may be initially shipped with a baseline collection rule set. In some embodiments, the baseline collection rule set is not automatically tuned by the assessment service. In other embodiments, the baseline collection rule set may be automatically tuned, but according to a different auto-tuning policy. In some embodiments, the baseline collection rule set may be updated via a configuration change at the assessment service. In some embodiments, the self-learning process of the assessment service will take into account occasional changes to the baseline collection rule set, so that a needed machine characteristic that has been removed from the baseline rule set is automatically added back to the auto-tuned rule set. Conversely a machine characteristic that is added to the baseline rule set may be automatically removed from the auto-tuned rule set. In this manner, the self-learning process can be designed to work in harmony with any existing data collection configuration mechanisms of the system.

In some embodiments, a company that uses the assessment service may employ an agent proxy, which may be configured to gather or aggregate data collected by multiple agents in the company's network (e.g. a customer premises network) and forward the gathered or aggregated data to the assessment service. In some embodiments, the agent proxy may be configured to act as a cache for collection rule set changes for the agents in the company network. Use of the agent proxy in this fashion further reduces transmission of collection rule changes over the public network, and allows the agents to obtain the changes more quickly, thereby improving system performance.

As will be appreciated by those skilled in the art, the disclosed features of the self-learning data collection system improve upon existing data collection and machine assessment systems in the state of the art to enhance the functioning of these systems. These and other features and benefits of the self-learning data collection system are described in further detail below, in connection with the figures.

FIG. 1 is a block diagram illustrating an example machine assessment system that implements self-learning data collection of machine characteristics, according to some embodiments.

As shown, the depicted data collection system 100 is implemented using an agent 120 and a machine assessment system 130, which can communicate with one another over network 125. The agent may be installed and executing on a remote machine 110 to collect and report machine characteristics data 142 of the remote machine to the machine assessment system. In some embodiments, the machine assessment system 130 may be implemented as a cloud-based or network-accessible service, which is configured to receive machine characteristics data from a large number of different agents and perform security vulnerability assessments on remote machines based on the received data. Each agent 120 may be uniquely associated with a remote machine 110, and each agent may be assigned a unique agent ID that identifies the agent to the machine assessment service.

In some embodiments, the agent 120 may be implemented as a lightweight software module on the machine 110. Different types of agents 120 may be implemented for different machine platforms, such as WINDOWS, LINUX, or MAC machines. In some embodiments, the agent 120 may be designed to run on a different computing system from the machine 110 being monitored. In that case, the agent 120 may be configured to establish network connections to the machine 110 and collect machine characteristics data 112 over these network connections.

In some embodiments, the agent 120 may be configured to collect a set of machine characteristics 112 of the machine 110, as specified by a collection rule set 114. The collected machine characteristics 112 may include information that indicates the machine's operating system (OS) version, OS patches installed on the machine, installed applications and their version information, patches, settings, and metadata, files or file contents on the machine, and configuration data such as the machine's registry entries, security settings, usage data, etc., among other information. The collection scope of the agent 120 is controlled by a collection rule set 114, which may include a set of rules specifying what machine characteristics to collect. The collection rule set can be updated by the machine assessment system 130, for example, via periodic instructions for rule set changes 182. In some embodiments, the collection rule set 114 may be implemented as a data structure that can be modified by the agent 120 based on instructions 182 received from the machine assessment system. For example, the collection rule set 114 may be implemented as a data file or a structured database (e.g. a SQL database). Depending on the embodiment, the collection rule set 114 may be stored locally on the remote machine 110, or on a distinct system that is network-accessible from the remote machine. In some embodiments, the collection rule set 114 may be maintained as an in-memory data structure in the memory space of the agent process.

The agent 120 may be tasked with continuously collecting specified data from the machine 110 and reporting the data 142 to the machine assessment system 130 in a secure manner. For example, the agent 120 may encrypt any collected data before transmitting it over the network 125, and/or employ secure communication channels such as transport layer security (TLS) connections when communicating with the machine assessment system. Some types of machine characteristics may be reported periodically according to a set schedule (e.g. once a day), while some types of machine characteristics may be collected in response to an event (e.g. a condition change at the remote machine 110 such as a reboot). In some embodiments, in addition to collecting data, the agent 120 may also be configured to perform other activities on the remote machine 110, such as updating configuration settings, generating alerts to the machine's user, among others.

In various embodiments, the network 125 may encompass any suitable combination of networking hardware and protocols necessary to establish communications between the agent 120 and the machine assessment system 130. In some embodiments, the machine 110 may execute in a private network of a company, behind a company firewall, and the network 125 may include a public network such as the Internet, which lies outside the firewall. The network 125 may encompass the different telecommunications networks and service providers that collectively implement the Internet. In some embodiments, the network 125 may also include private networks such as private local area networks (LANs), private wide area networks (WANs), or private wireless networks. The network 125 may be implemented using different hardware (e.g., modems, routers, switches, load balancers, proxy servers, etc.) and software (e.g., protocol stacks, accounting software, firewall/security software, etc.) for establishing networking links between the remote machine 110 and the machine assessment system 130.

As shown, reported characteristic data 142 about the remote machine 110 may be transmitted over the network 125 and received by a data ingestion component 140 of the machine assessment system 130. In some embodiments, the data ingestion module 140 may be implemented as a web service with a web service interface that can be accessed by the agent 120. The reported data 142 may be formatted as objects in JavaScript Objection Notation (JSON). The data ingestion module may receive reported data 142 from many agents 120 and perform a series of tasks to ingest the reported data. Such tasks may include authenticating the sender of the data, unpacking the incoming data, parsing and/or perform certain initial processing of the data, and storing the data in a local data repository of the machine assessment system such as the remote machine profile data store 150, as shown. In some embodiments where incoming data 142 is received from different customers or companies, the data may be stored in the repository in an encrypted form.

As shown, in some embodiments, the reported data 142 may be used to create a remote machine profile 150 of the remote machine 110 at the machine assessment system 130. The machine profile 150 may provide a virtual representation of the remote machine 110 based on the received characteristics data about the machine. In some embodiments, the machine profile 150 may include a full history of past states of the remote machine. In some embodiments, certain inferred data or intermediate assessment result data about the machine may also be stored as part of the machine profile 150.

As shown, the stored machine profile 150 may be used by various modules or services in the machine assessment system 130 to assess the remote machine 110. The modules or services may include one or more machine assessment modules or services 160, a user query interface 162, and others. The machine profile 150 may be seen as the definitive representation of the remote machine 110 in the machine assessment system 130, so that all analysis or reports about the remote machine are performed against the machine profile 150.

The machine assessment module 160 may be implemented as one or more services, which are used to answer a variety of questions about the remote machine. The assessment process may be conducted by an assessment orchestrator, which may invoke the various assessment services to perform assessments on the machine. In some embodiments, the underlying computing resources used by the assessment services may be provided by a platform-as-a-service (PaaS) provider, such as AMAZON WEB SERVICES or MICROSOFT AZURE.

The assessment may determine various security vulnerabilities of the machine based on the collected machine characteristics. For example, an assessment may detect conditions such as the existence of malware signatures, missing application patches, incorrect or suspicious file permissions or locations, users with inappropriate access privileges, among other things. In some embodiments, the assessment module 160 may observe and track these conditions over time, to determine a problematic or suspicious pattern of changes on the remote machine. The assessment module 160 may then generate an assessment report that details any detected security vulnerabilities about the machine, which may be provided the machine's owners via a user interface of the machine assessment system 130. In some embodiments, the assessment module 160 may observe many machines for a particular company, customer, or location, and generate an overall assessment reports for the computing environment of the entire company, customer or location, in addition to individual reports for individual machines.

In some embodiments, the machine assessment module 160 may generate output for a data collection tuning component 170, which may also be implemented as a separate service within the machine assessment system 130. The data collection tuning 170 may be configured to determine, based on the output of the assessment module 160, what additional machine characteristics of the remote machine need to be added to the agent's collection rule set 114, and what currently collected machine characteristics can be retired from the collection rule set. These changes may be determined based on what data was actually used or needed during the assessment process of the machine. For example, if it is determined that the machine has a particular application installed on the machine and that assessment could not be completely performed because certain application specific metadata was not collected, the data collection tuning module 170 will add the application specific metadata as a machine characteristic to collect from the machine. As another example, if it is determined that an application on the machine was removed, the data collection tuning module 170 may remove certain data specific to that application from the machine characteristics being collected. In some embodiments, a collected machine characteristic will be retired from collection if it is not used for a period of time, or for a number of assessments. In some embodiments, a collected machine characteristic may be specified to be collected only for a particular period of time.

In some embodiments, to generate the output for the data collection tuning module 170, the machine assessment module 160 may tag or mark data fields in the stored machine profile 150 to indicate those data items that were accessed during the assessment process. The data collection tuning module 170 may then determine, possibly at a later time and asynchronously from the assessment process, what data to add or remove from the data collection based on the tags left by the machine assessment module 160. In some embodiments, the tuning decisions of the tuning module 160 may be governed by an auto-tuning policy, which is configurable by an administrator of the machine assessment system or the owner of the remote machine 110.

In some embodiments, the tuning decisions of the tuning module 170 may be affected by other modules in the machine assessment system 130, such as the user query interface 162. For example, the tuning module 170 may take into account what user queries are issued against the machine profile 150, and use this information to determine changes to the collection rule set 114. In some embodiments, the machine assessment system 130 may expose the user query interface to users to allow users to ask specific questions about the remote machine. For example, a user query may ask for a list of all files that a particular application has written recently. The query interface 162 may allow users to specify queries using a query language, such as SQL or GRAPHQL. In some embodiments, the query interface 162 could be an interactive or graphical user interface. In other embodiments, the query interface 162 may be an interface that is not a user interactive interface. In some cases, these queries may be submitted repeatedly, on a periodic basis. The tuning decisions of the collection tuner 170 may be made based on what machine characteristics data were fetched or missing when servicing these user queries. For example, machine characteristics that are needed by these repeat queries may be added to the collection rule set 114 when the repeat queries are seen by the query interface, and expired from the collection rule set when the queries have stopped.

As shown, in some embodiments, the tuning decisions of the data collection tuning module 170 may be stored in a data collection catalog 172. The data collection catalog 172 may be implemented as a database or one or more data files. The data collection catalog 172 may store a master copy of the current collection rule set for each individual agent, as determined by the collection tuner 170. In some embodiments, the agent's copy of the collection rule set 114 is periodically synchronized with the master copy. In some embodiments, the data collection catalog may also store the history of collection rule set over time, so that changes to the collection rule set are stored as individual versions of the collection rule set. The data collection catalog 172 may then be used by another component such as to the rule set update module 180 to generate rule set changes 182 for the agent 120 to synchronize the agent's collection rule set 114.

In some embodiments, a separate catalog may be maintained for each agent that is registered with the machine assessment system 130. In some embodiments, separate catalogs may be maintained for different groups of agents registered with the machine assessment system, in order to isolate the collection rule sets for the different groups of agents (e.g. agents operating within different companies). In some embodiments, the collection catalog 172 may be organized in a hierarchy, which may specify collection rules at multiple levels (e.g. company-wide rules, location-specific rules, machine-specific rules, etc.). The full collection catalog for a particular machine will inherent the collection rule sets defined for all parent groups to which it belongs (e.g. its company rule set, its location rule set, etc.). In some embodiments, a user may define a custom collection rule set that can be managed individually. For example, a user may define a collection rule set to collect machine data for a particular query about a machine, so that custom data collection can be turned on and off to support the particular query.

As shown, the contents of the data collection catalog 172 may be configurable via a collection configuration interface 174. The collection configuration interface 174 may be included in a user interface (e.g. a graphical user interface or GUI) or a programmatic interface (e.g. an application programming interface or API) exposed by the machine assessment system 130. The collection configuration interface 174 may modify a user to adjust the contents of the data collection catalog 172, to manually override the tuning decisions of the data collection tuning module 170. In some embodiments, the configuration interface 174 may also be used to configure the behavior of the data collection tuning module 170 itself, for example, to modify the tuning policy of the tuner 170, or temporarily disable the tuner for certain types of data.

As shown, the contents of the data collection catalog 172 is used by the rule set updater 180 to provide rule set changes 182 to the agent 120. The pushing of changes 182 may occur asynchronously from data collection reports from the agent 120. In some embodiments, changes to the collection rule set may be versioned, so that each change to the rule set is assigned a different version identifier. When providing the rule set changes 182 to the agent, the rule set updater 180 may only provide a delta between the version of the collection rule set 114 at the agent and the latest version of the collection rule set stored in the data collection catalog 172. In this way, only a small amount of data collection rules is transmitted over the network 125, so as to reduce network utilization by the system. In some embodiments, the version identifier may be an increasing number that is maintained between the agent and the machine assessment system. In some embodiments, the version identifier may be a hash of the data in the collection rule set. In some embodiments, the changes 182 provided by the rule set updater may be encrypted and compressed, to further reduce network utilization and increase security.

In some embodiments, the agent 120 and the rule set update module 180 may implement a synchronization protocol, where the two components will communicate periodically to synchronize the two respective collection rule sets by transmitting small changes 182 to the agent. However, if it is discovered that the agent is in an unexpected state, for example, where the agent has reverted back to a previous state due to a machine restore, the rule set updater 180 may cease further updates to the agent or resend the entire collection rule set to the agent to replace the collection rule set 114 at the agent. In some embodiments, the synchronization protocol may implement a pull mechanism by the agent 120, so that the rule set updater 180 is implemented as a service that waits for pull requests from the agents.

As discussed, the described auto-tuning or self-learning process may be performed repeatedly and continuously, so that the data collection performed by the agent 120 is continually adapting to the needs of the machine assessment system 130. As the assessment system obtains more data about the remote machine 110, additional assessment questions may be triggered, which causes the agent to collect more data from the machine 110. In this manner, the assessment system and the agent work in tandem to gradually converge on an optimal set of machine characteristics to collect from the machine 110, without the need for any human intervention.

Figure 2:
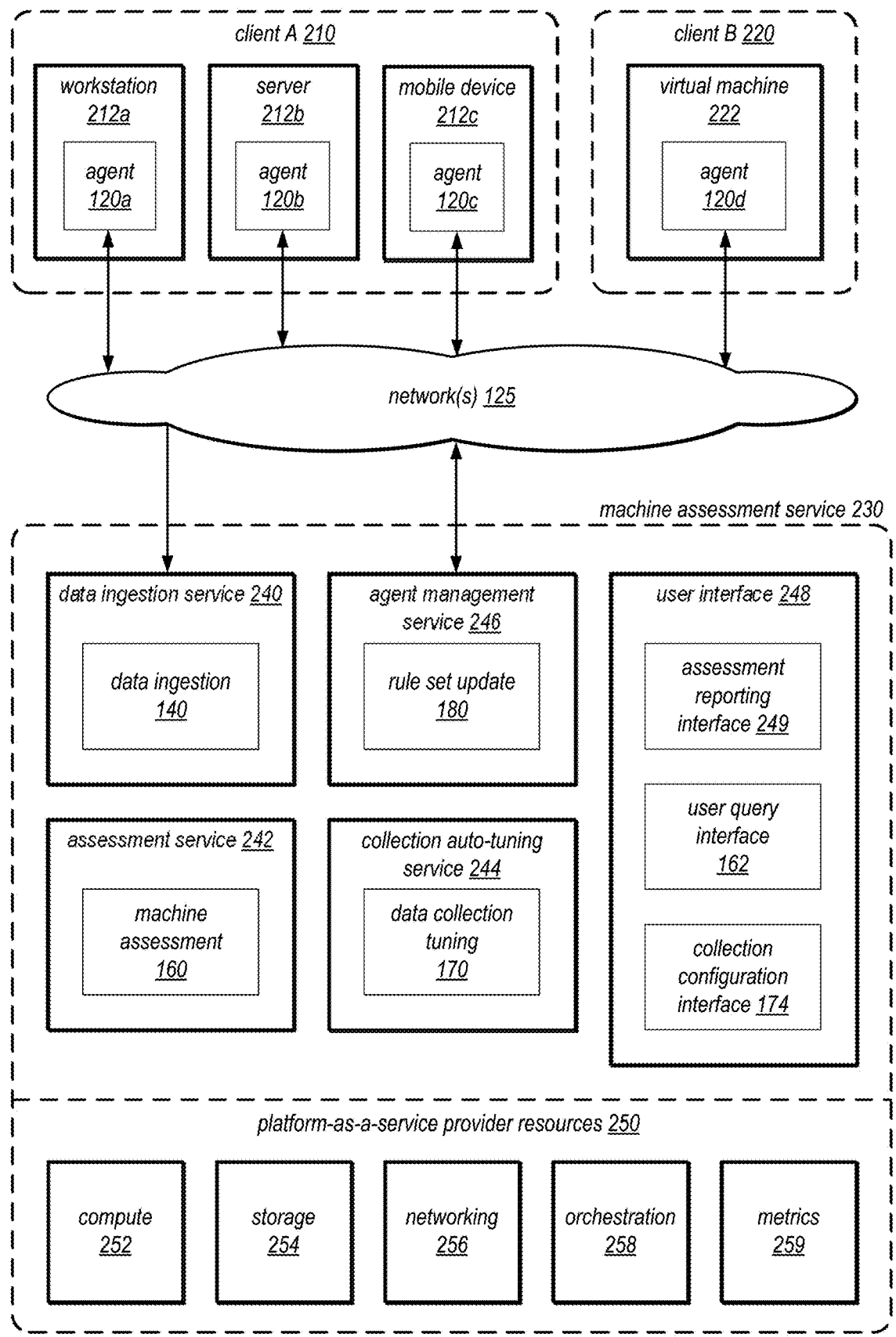
FIG. 2 is a block diagram illustrating a machine assessment service that is implemented in a platform-as-a-service provider network, according to some embodiments.

FIG. 2 is a block diagram illustrating a machine assessment service that is implemented in a platform-as-a-service provider network, according to some embodiments. As shown in this example, the machine assessment system of FIG. 1 is implemented as a machine assessment service 230, which may be hosted in a platform-as-a-service (PaaS) network.

As shown, the machine assessment service 230 may be configured to interact with various agents executing on different clients 210 and 220. The different clients may be different groups, organizations, companies, or other types of entities. In some embodiments, distinct clients 210 and 220 may be associated with a different user account of the machine assessment service 230. As shown, the clients in this example may own different types of computing resources, such as a workstation 212*a*, a server 212*b*, a mobile device 212*c*, and a virtual machine 222. The virtual machine 222 may be an instance of an emulated computer that is hosted on a physical virtual machine host. The virtual machine host may implement virtualization hardware and/or software (e.g. hypervisors) to execute and manage multiple instances of guest operating systems. Example implementations of such virtualization technologies include VMWARE ESX/ESXI, MICROSOFT HYPERV, AMAZON WEB SERVICES, and MICROSOFT AZURE. As another example, another type of virtualized execution environment is the container, which provides a portable and isolated execution environment over a host operating system of a physical host. Example implementations of container technologies include DOCKER, GOOGLE KUBERNETES, AMAZON WEB SERVICES, and MICROSOFT AZURE. As shown, each of these types of machines or execution environments may be monitored via an agent 120*a-d* that collects machine characteristic data from the machines or execution environments, as described in connection with FIG. 1. As may be appreciated, agents may be implemented on other types of computing systems, including embedded systems, networking devices, storage devices, Internet-of-Things (IoT) devices, vehicles, and the like.

The machine assessment service 230 in this example is implemented as a number of services 240, 242, 244, 246, and 248 in the PaaS service provider network. As shown, the data ingestion component 140 is implemented as part of a data ingestion service 240, which may be configured to receive and ingest agent reports from many different agents. The machine assessment component 160 is implemented by one or more assessment services 242, which may be configured to examine individual machine profiles as discussed in connection with FIG. 1 and generate assessment reports for the machines. The data collection tuning component 170 is implemented as part of a collection auto-tuning service 244, which may periodically examine the output of the assessments of machines to determine changes to the data collections on the machines. The rule set updater 180 is implemented as an agent management service 246, which may be configured to communicate with the agents to control and manage the agents.

In some embodiments, the machine assessment service 230 may provide direct access of data storage to the agents, using storage services 254 provided by the platform-as-a-service provider. For example, the agents may be allowed to directly store to or fetch from a database, file system, or volume hosted in the cloud. In some embodiments, the agent may not have direct access to such storage, and must interface with such storage though a service interface (e.g. a web service via a RESTful API). In some embodiments, the storage provided by the machine assessment service 230 may be persistent storage. In some embodiments, provided storage may not guaranteed to be persistent, so that if the service is restarted, some of the agents' records may be lost. In some embodiments, the persistent storage provided by the machine assessment service 230 may be enhanced using a high-performance in-memory cache, which may be implemented on a managed cluster of compute nodes, such as a REDIS cluster.

As shown, in some embodiments, the machine assessment service 230 also implements a user interface 248, which may be a web-based graphical or command line user interface. As shown, the user query interface 162 of FIG. 1 and the collection configuration interface 174 of FIG. 1 may be implemented as part of the user interface 248. Additionally, the user interface 248 also includes an assessment reporting interface 249, which may be configured to provide results of machine assessments to users. In some embodiments, the assessment reporting interface 249 may include a notification interface that pushes notifications to registered users, for example, via email or text, or to a client-side repository.

In some embodiments, the machine assessment service 230 may be implemented within a platform-as-a-service provider network, and the agents 120 and other clients of the machine assessment service 230 may convey services requests to and receive responses from PaaS provider network via network 260. In some embodiments, the service request and responses may be web services requests and responses and formatted as JSON documents. The machine assessment service 230 may support REST-style or document-based (e.g., SOAP-based) types of web services requests. In some embodiments, the machine assessment service 230 may implement service interfaces using other types of remote procedure calling protocols, such as GOOGLE PROTOCOL BUFFERS or PROTOBUF. The PaaS provider network may provide hardware and/or software to implement service endpoints, such that a request directed to that endpoint is properly received and processed.

As shown, the PaaS provider network may provide different types of computing resources 250, which can be leased by service customers to implement custom hosted services. As shown, the PaaS provider may provide resource services such as compute resource service 252, storage resource service 254, networking resources service 256, orchestration service 258, and resource metrics service 259. The services of the machine assessment service 230 may be built using these underlying resource services provided by the PaaS provider. In some embodiments, the PaaS resources 250 may implement features such as load balancing of incoming service requests and/or dynamic management and scaling of service node pools. In some embodiments, each of the services 240, 242, 244, and 246 may be implemented using a pool of service nodes provided by the PaaS provider, which may be individual instances of virtual machines. In some embodiments, the PaaS provider may be a provider such as AMAZON WEB SERVICES or MICROSOFT AZURE.

Figure 3:
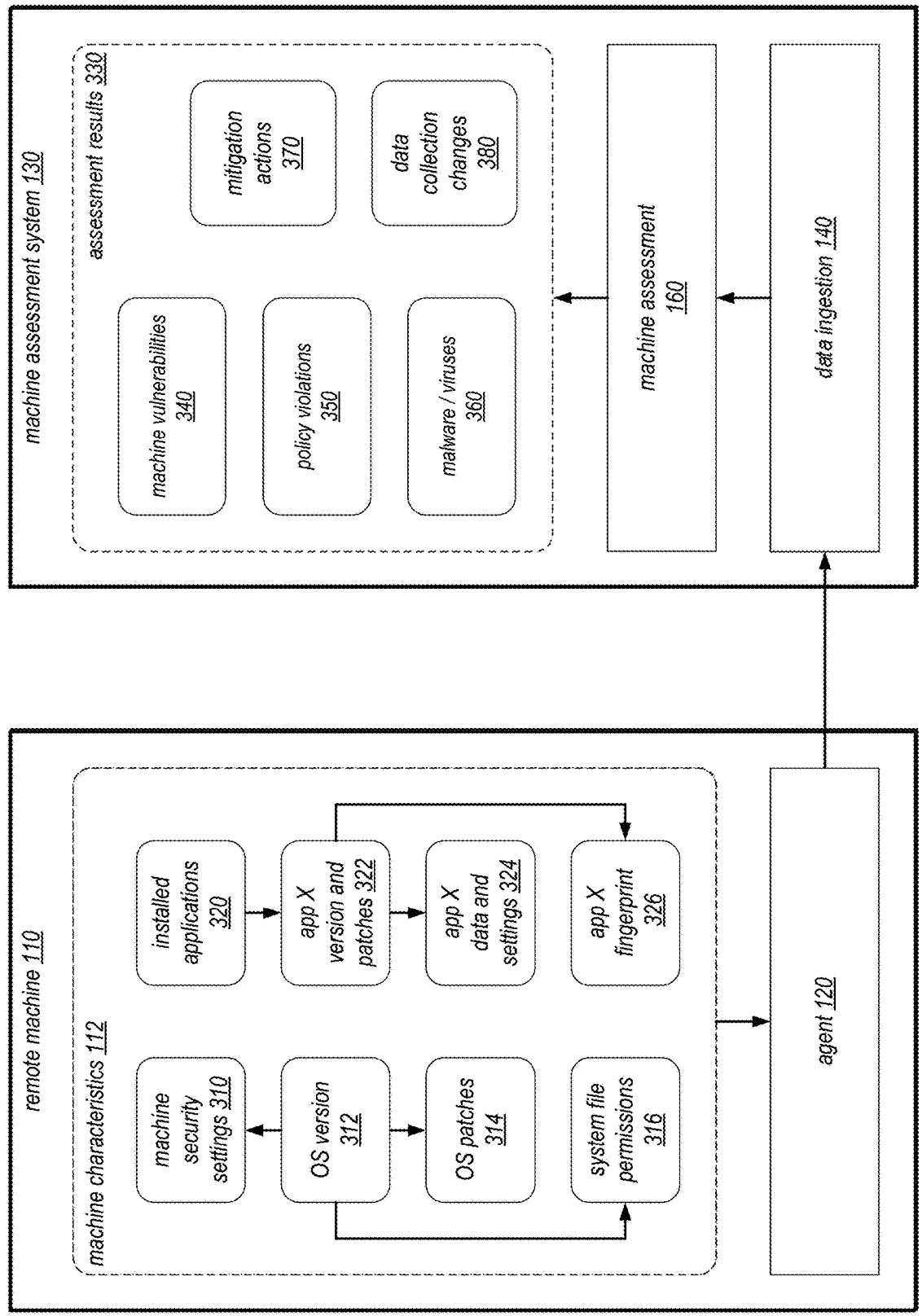
FIG. 3 illustrates different types of machine characteristics collected and assessment results produced by a machine assessment system, according to some embodiments.

FIG. 3 illustrates different types of machine characteristics collected and assessment results produced by a machine assessment system, according to some embodiments.

As shown in this example, the machine characteristics 112 that are collected by the agent 120 includes a number of different characteristics data about the machine 110. In this example, the arrows between the machine characteristics indicate the order in which the machine characteristics are added to the agent's collection set during the auto-tuning process.

As shown, the collected machine characteristics 112 may initially collect the operating system (OS) version 312 of the machine and the list of installed applications 320 on the machine. When this information is provided back to the machine assessment system 130, the machine assessment system may update the collection rule set of the agent to collect additional information about the machine, such as the machine security settings 310, a list of OS patches 314, various system file permissions 316, and the version number and patch information for a particular application X 322. When this augmented set of characteristics data is analyzed by the assessment system, the assessment system may further expand the collection set to include certain application-specific data and settings for application X 324, and a fingerprint from the install-base of application X 326. This self-learning or auto-tuning process may continue to change the collection set until the assessment system determines that no additional data about the machine 110 is needed for further assessments. In some embodiments, changes to the collection set and a subsequent period of auto-tuning may be triggered by other events, such as changes in the machine 110 (e.g. the installation of a new application). In some cases, an event may indicate a change in the collection requirements at the assessment system. For example, the assessment system may grow its collection to add monitoring for a new type of security threat, or to check for a newly released security patch from a vendor.

In some embodiments, the progressive tuning of the data collection may be performed according to a tuning policy, which may instruct the agent to collect initial machine characteristics for certain high-level categories (e.g. the OS platform of the machine: MAC, LINUX, WINDOWS, etc.), following by lower level categories (e.g. variants of the OS: UBUNTU, DEBIAN, WINDOWS 7, WINDOWS 10, etc.), and then even lower level categories (e.g. characteristics associated with particular software: OFFICE, JRE, CHROME, FIREFOX, APACHE, WEBLOGIC, etc.).

Depending on the embodiment, the agent may be instructed to collect other types of machine characteristics data not explicitly shown in the figure. For example, an agent for a WINDOWS (or SAMBA) machine may collect particular registry key entries or registry key permissions on the machine. The registry of the machine may be implemented in a hierarchical key-value data store and include various settings used by the operating system to control the machine. Individual keys in the registry may be associated with different permission rights for different users.

In some embodiments, the agent may collect different types of file metadata for particular files, including file size, file access time, file creation time, computed file hash values or checksums, etc. In some embodiments, the file permissions data collected on a WINDOWS machine may include a file's Discretionary Access Control List (DACL) for file access control and System Access Control List (SACL) for file access auditing. On a UNIX machine, collected file permission data may include a file's owner ID or name, group ID or name, mode (read/write/execute by world/group/owner), any special permission metadata on variants of UNIX platforms, and Access Control List (ACL) extensions on UNIX systems that support ACLs. In some embodiments, a specific collection rule may simply check whether a particular file exists or not.

In some embodiments, the agent may be instructed to collect security configuration settings on the remote machine. For example, on a WINDOWS machine, such security configuration settings may include configuration settings found under WINDOWS Group Policy Objects for both local GPOs and domain GPOs, for those machines that members of a domain. For UNIX machines, the security configuration settings may include output of the sysctl system call executed on the machine; the firewall configuration, file system configuration, kernel configuration of the machine, and the configuration of one or more services such as Secure Shell (SSH).

In some embodiments, the agent may be instructed to collect the output of a program (e.g. a script) on the remote machine. In some embodiments, the agent may be configured to invoke programs or scripts in order to perform the data collection. The program may be for example a shell script, a bash script on a UNIX machine or a PowerShell script on a WINDOWS machine. Depending on the embodiments, script programs written in other programming languages may also be used to generate collected data.

In some embodiments, the agent may be instructed to collect data by using a third-party library (e.g. a system library associated with the machine's operating system). Such third-party library may include, for example, kernel32.dll on WINDOWS or libaudit on LINUX. These libraries may be invoked on the machine in different ways. In some embodiments, the library may be loaded within the agent's process memory and invoked directly by the agent. In some embodiments, the library may be loaded in an isolated child process of the agent and called by the child process for data collection purposes. In some embodiments, the library may be called outside of the agent's memory as an external process (e.g. for a separate application). In some embodiments, the separate application may be one that is compiled by the agent for data collection purposes. In some embodiments, the separate application for data collection may be bundled with the agent (e.g. either as an initial install with the agent or downloaded as a subsequent patch).

The figure also depicts a number of different assessment results 330 that are generated from the machine assessment 160, which may be provided to users via the assessment reporting interface 249. As shown, the assessment results may include machine vulnerabilities 340. Machine vulnerabilities may indicate detected problem conditions of the machine 110 based on a combination of collected machine characteristics 112. For example, a machine vulnerability may indicate that a critical OS patch has not been installed on the machine 110. As shown, the assessment results may also indicate policy violations 350 associated with the machine. For example, the violation may indicate that certain sensitive data have not been appropriately encrypted on the machine. As shown, another type of assessment result may indicate the existence 360 of a malware, virus, or other undesirable software on the machine. For example, the assessment results may indicate that a fingerprint for a type of spyware is detected on the machine 110. In some embodiments, the assessment results may also indicate mitigation actions 370 to take to mitigate the detected machine vulnerabilities, policy violations, or malware/viruses. For example, an assessment report for the machine 110 may indicate to install a particular patch for the machine, and to deinstall one or more suspicious programs. In some embodiments, the agent 120 may be configured to perform some of the mitigation actions 370 automatically, or provide a set of step-by-step instructions for an administrator to perform the mitigation actions.

In addition, as shown, another type of assessment result that may be provided is an indication of data collection changes 380 for the machine 110. This information may be provided for informational purposes to the user, to allow the user to understand what data is being collected about the machine 110, and how these collections have changed over time. This type of information allows the user to better understand the data collection decisions of the machine assessment system 130, and in some cases, may allow the user to diagnose problems in the assessment of the machine. In some embodiments, the assessment results 330 may indicate an indeterminate conclusion for certain machine assessment results due to missing machine data, and indicate the missing data as part of the assessment results. The user may then use this information in the assessment results to add the missing data to the agent's collection rule set via the configuration interface 174, as discussed in connection with FIG. 1.

Figure 4:
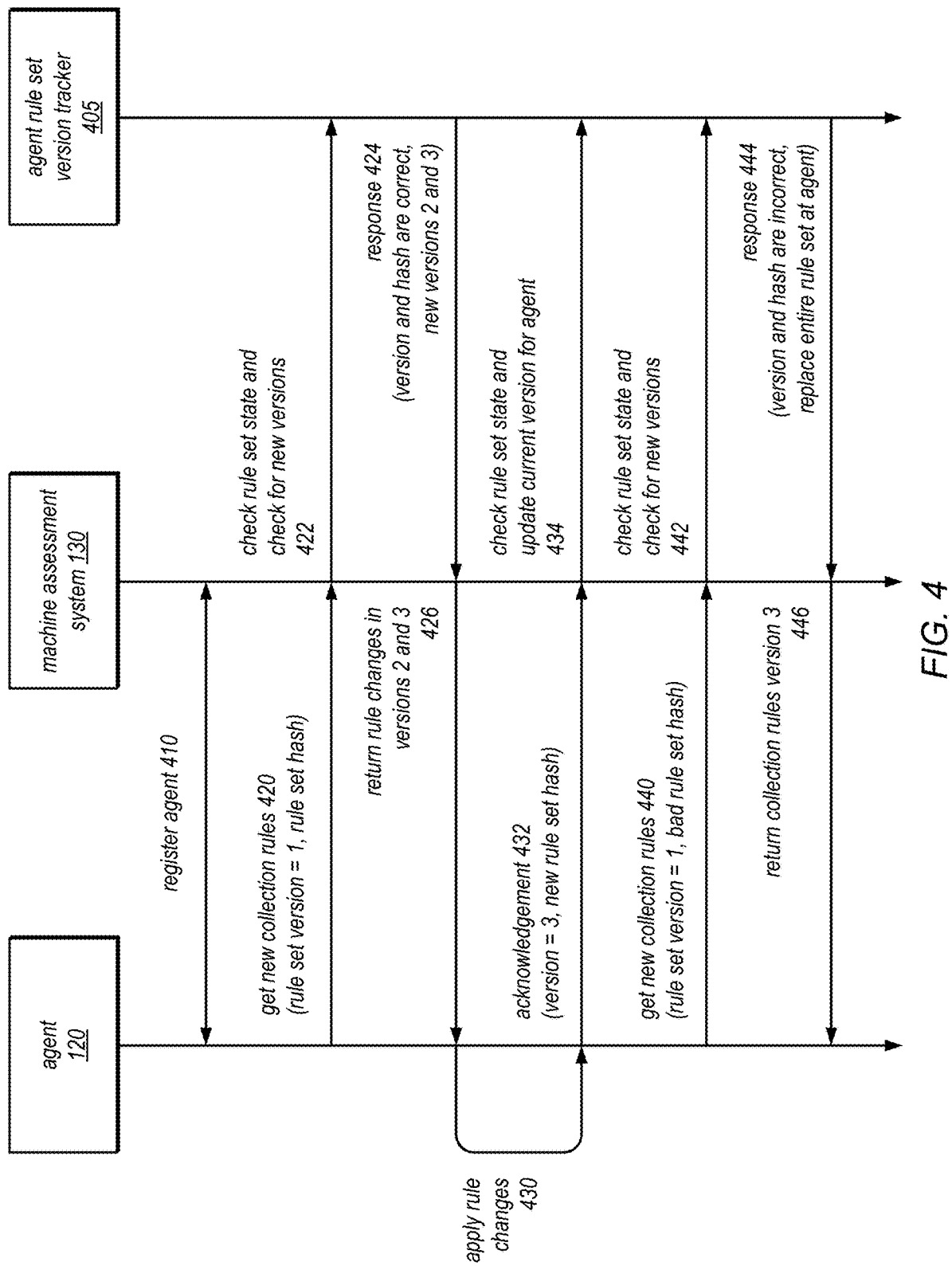
FIG. 4 illustrates example interactions between an agent and a machine assessment system to provide collection rules updates to the agent, according to some embodiments.

FIG. 4 illustrates example interactions between an agent and a machine assessment system to provide collection rules updates to the agent, according to some embodiments.

As shown, the agent 120 may first register 410 with the machine assessment system 130. This registration 410 may occur when the agent initially starts up, for example, when it is first installed at the remote machine 110. In some embodiments, the agent 120 may initiate the registration process. The registration process may establish and agent ID for the agent 120, and establish a starting point (i.e. version 0) of the collection rule set at the agent. In some embodiments, the agent may download the initial version of collection rule set from the machine assessment system at the time of registration. In some embodiments, the agent 120 may initially be shipped with a set of baseline collection rules, and communicate with the machine assessment system to auto-tune an additional collection rule set on top of the baseline set.

At operation 420, the agent 120 sends a request to get new collection rules from the machine assessment system 130. In some embodiments, the acquiring of new collection rules may be performed as a pull of data by the agent 120. In some embodiments, new collection rules may be pushed to the agent by the machine assessment system. As shown, in this example, the pull request may indicate the current rule set version of the collection rule set at the agent, which is version 1. Moreover, in this example, the request 420 also includes a rule set hash value computed from the contents of the agent's collection rule set.

At operation 422, the machine assessment system sends one or more requests to check the current rule set state of the agent with an agent rule set version tracker 405, and also to check for the latest rule set versions and provide them to the agent. The check of the current rule set state is performed in some embodiments to ensure that the agent 120 and the machine assessment system 130 remain synchronized as to the state of the collection rule set at the agent. In some embodiments, the tracker 405 may be configured to compute or retrieve the hash of the version of collection rule set reported by the agent, and compared this hash to the agent's reported hash to ensure that that the two are a match. If the agent's reported current rule set version and hash value are as expected, the machine assessment system may provide only a delta of changes in new versions of the collection rule set. In this manner, less data is transmitted over the public network about the agent's collection rule set. Sending less data improves both the speed and security of communications between the agents and the assessment system. In some embodiments, the data is sent over secure communication channels such as transport layer security (TLS) connections.

Depending on the embodiment, the agent rule set version tracker 405 may be implemented as a part of the machine assessment system 130 or a separate standalone component or service. In some embodiments, the tracker 405 may maintain data about the agent 120 in a data repository, including the agent's ID, its last reported current version and the hash of that version, and any available new versions of the collection rule set. New versions of the collection rule set may not be pushed to the agent immediately, so that any changes can be picked up by the agent at a time that is convenient for the agent, without causing excessive disruptions to the operations of the remote machine.

At operation 424, the tracker 405 responds 424 that the agent's reported version and hash are correct, and there are new versions 2 and 3 of collection rule set changes to be provided to the agent. These changes may be determined by the data collection tuning component 170, as discussed in connection with FIG. 1.

Based on this information from the tracker 405, the machine assessment system 130 returns 426 the rule changes indicated in versions 2 and 3 back to the agent 120. In some embodiments, the rule changes may be indicated as additions or removals of machine characteristics or collection rules from the agent's collection rule set. In some embodiments, the response 426 may be encrypted and/or compressed before it is sent to the agent.

In response to the rule changes, at operation 430, the agent applies the rule changes to change its collection behavior. As the changes are successfully accepted, the agent 120 may update the current version number of its collection rule set to the latest received version from the machine assessment system, and compute a new hash of the updated collection rule set. In some embodiments, the receipt of new change instructions from the machine assessment system may be treated as an event by agent to cause the agent to immediately collect and report machine characteristics data back to the machine assessment system. At operation 432, the agent provides the accepted version number (version 3) and the new rule set hash to the machine assessment system as an acknowledgement. At operation 434, the machine assessment system checks the rule set state acknowledge by the agent (e.g. the new version number and hash value), and updates the current version of the agent's collection rule set to be the agent's acknowledged version. This recorded version may be used to perform the next version check for the agent.

At operation 440, the agent sends another request to obtain new collection rules from the machine assessment system, as it did in operation 420. However, as shown, this request indicates the current rule set version to be version 1, which is not what is expected (version 3) by the machine assessment system and the version tracker 405. Additionally, the request includes a bad rule set hash value, that is different from what the machine assessment system expects. In some embodiments, these types of out-of-sync condition may result from a reversion of the remote machine to a previous state, a corruption of the data maintained by the agent, or an attempt by a malicious actor to impersonate the agent.

As shown, in response to request 440, the machine assessment system 130 performs the checks 442 as it did in operation 422, and determines from the response 444 that the agent's reported rule set version and hash are incorrect and the agent's collection rule set is out-of-sync with the machine assessment system. As a result, the machine assessment system 130 will send a response 446 providing all collection rules for the agent (up to version 3) to replace the entire collection rule set copy at the agent, instead of sending only instructions for rule changes. In some embodiments, the full collection rule set may be sent in multiple segments, to reduce network bandwidth utilization. If the collection rules are successfully applied at the agent, the agent will acknowledge version 3 as its current collection rule set version and provide a new rule set hash. In some embodiments, if an out-of-sync condition is detected for the agent, the machine assessment system may cease providing further updates to the agent, and flag an alert for the agent for a further investigation by a human administrator.

Figure 5:
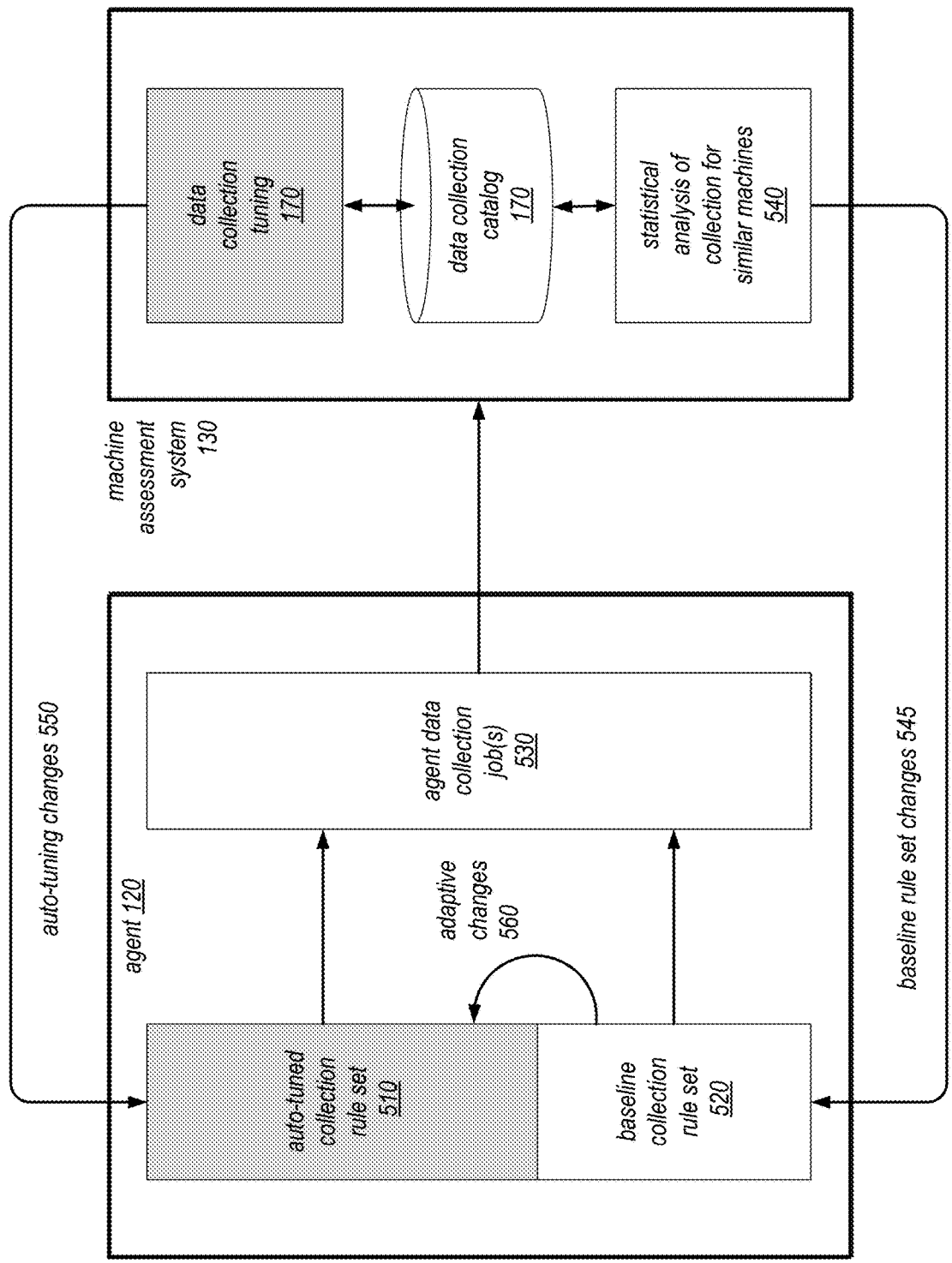
FIG. 5 illustrates an agent that maintains a baseline collection rule set and an auto-tuned collection rule set that is automatically tuned by a machine assessment system, according to some embodiments.

FIG. 5 illustrates an agent that maintains a baseline collection rule set and an auto-tuned collection rule set that is automatically tuned by a machine assessment system, according to some embodiments.

As shown, in some embodiments, the data collection behavior of the agent 120 may be controlled by two collection rule sets, an auto-tuned collection rule set 510, and a baseline collection rule set 520. As shown, the auto-tuned collection rule set 510 may be programmatically changed 550 by the data collection tuning module 170, as discussed in connection with FIG. 1. The baseline collection rule set 520 may be a separate collection rule set that is provided with the initial install of the agent 120, and its initial contents may be determined based on initial information about the machine, such as the type of operating system of the machine, the entity that owns the machine, etc. In some embodiments, the baseline collection rule set 520 is also automatically tuned without human intervention, based on a statistical analysis of data collection for similar machines 540. For example, the scope of the baseline collection may be analytically determined to include commonly collected machine characteristics for similar machines (e.g. machines with common operating systems, OS versions, installed applications, system configurations, etc.). If a statistical analysis reveals that an organization typically has a particular type of application installed on its machines, the baseline collection rule set for that organization may assume that that application is installed. The determined baseline collection rule set may then be pushed 545 to respective agents for group of remote machines, for example, machines at a particular location or machines operated by a particular company, to update data collection for the entire group.

In some embodiments, the baseline collection rule set 520 may be changed through other means, for example, as a result of manual configuration changes from the machine assessment system 130 or another configuration interface. As example, the baseline collection rule set may be changed to include data needed for servicing permanently ongoing queries received via the user query interface 162. Such changes may occur occasionally, and may occur for a group of machines (e.g. on a company, customer, or location basis), as well as an individual machine basis.

As shown, in some embodiments, both collection rule sets 510 and 520 are combined to control the periodically agent data collection jobs 530. In some embodiments, the agent 120 may collect machine characteristics that represent the union of all machine characteristics specified in both collection rule sets 510 and 520. In some embodiments, the agent 120 may employ more than two collection rule sets that are each automatically tuned according to different auto-tuning policies.

In some embodiments, the auto-tuned collection rule set 510 may adaptively change 560 based on changes to the baseline collection rule set 520. For example, when a machine characteristic is removed from the baseline collection rule set 520, the removed characteristic may be added back to a particular agent's auto-tuned collection rule set 510, based on the needs of the machine assessment system 130. As another example, when a machine characteristic is added to the baseline collection rule set 520, the machine assessment system may immediately cause the added characteristic to be removed from the data collection catalog 170 for the agent(s), so that the added characteristic is not redundant in both collection rule sets. In some embodiments, the agent 120 may be configured to avoid redundant collection of machine characteristics that are present in both collection rule sets, so that any data collection job 530 will collect and report a redundant machine characteristic only once.

Figure 6:
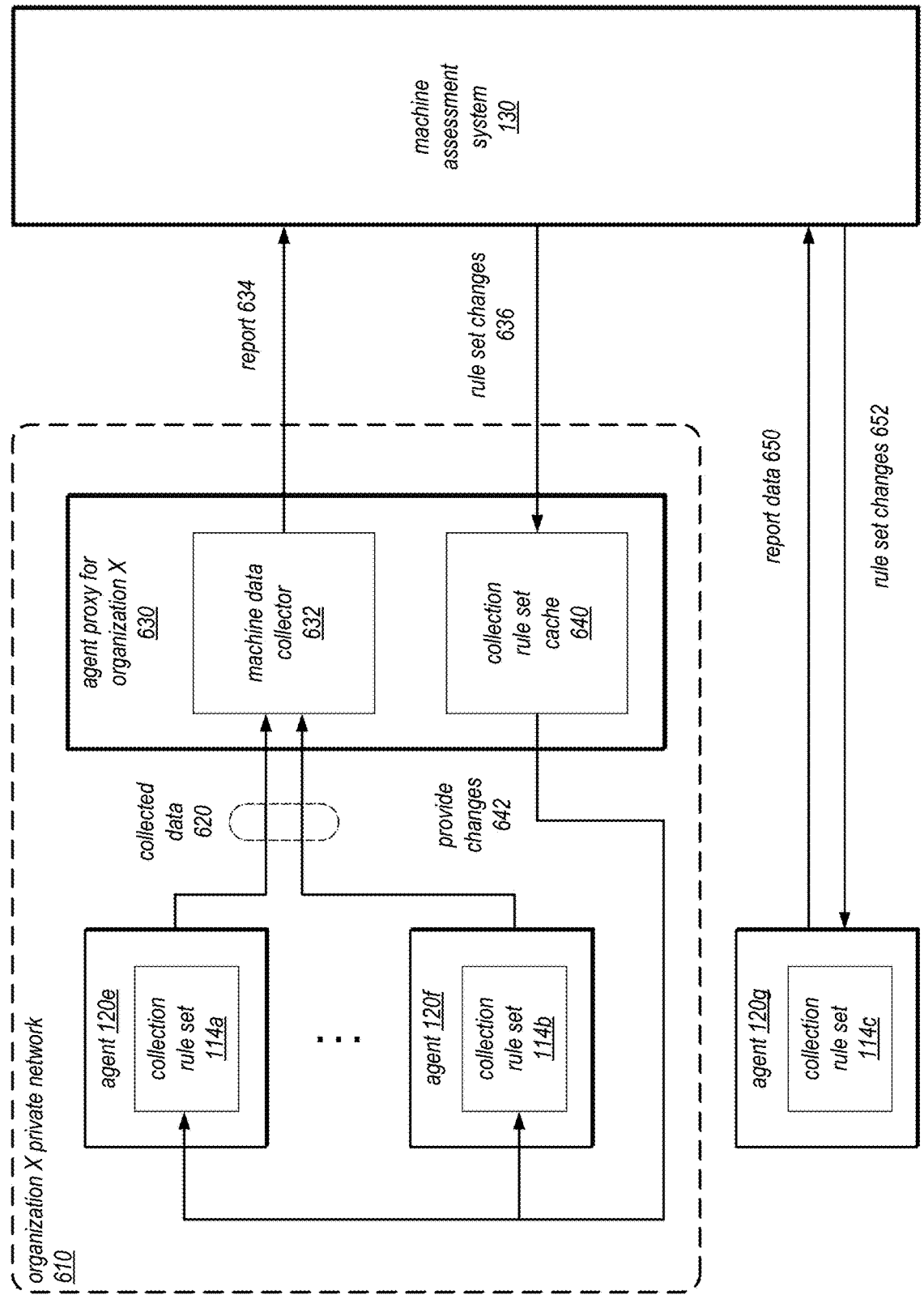
FIG. 6 illustrates an example agent proxy that collects collected machine data from multiple agents and caches collection rule set updates for the multiple agents, according to some embodiments.

FIG. 6 illustrates an example agent proxy that collects collected machine data from multiple agents and caches collection rule set updates for the multiple agents, according to some embodiments.

As shown in this example, an agent proxy 630 is implemented for an organization X, which is executing inside organization X's private network 610 (e.g., behind organization X's network firewalls). In some embodiments, the agent proxy 630 may be implemented elsewhere, for example, at the location of the machine assessment system 130 (e.g. on the PaaS platform as discussed in connection with FIG. 2), or in a third-party or public network.

As shown, the agent proxy 630 is configured to receive collected data 620 from a number of agents (e.g. agents 120e and 120f) and report 634 the collected data to the machine assessment system 130, using a machine data collector module 632. In some embodiments, the proxy 630 may simply forward the collected data 620 without substantial changes. In some embodiments, the proxy 630 may perform additional processing on the collected data before forwarding the collected data. For example, the collector module 632 may combine or aggregate the collected data, compute certain data summaries, repackage the collected data, compress and encrypt the collected data, etc., among other things. Use of the agent proxy 630 in this fashion allows collected data to be reported 634 less frequently and more securely.

As shown, in some embodiments, the agent proxy 630 may implement a collection rule set cache 640. The collection rule set cache 640 may receive rule set changes 636 for the agents 120e and 120f, store them, and provide 642 the changes to the agents 120e and 120f when they are ready to accept the changes. Thus, the agent proxy 630 spares the machine assessment system 130 from having to directly interact with each individual agent 120e and 120f This cache mechanism is particularly useful for propagating common rule set changes that are to be applied to a large number of agents in a particular organization. For example, by caching the rule set changes locally in the private network 610, the agents can obtain recent rule set changes much more quickly and securely.

In some embodiments, the agent proxy 630 may act as an individual agent in its communications with the machine assessment system 130, for example, using the protocol as discussed in connection with FIG. 4. Accordingly, the machine assessment system 130 may present the same communication interface to the agent proxy as for any other agent (e.g. agent 120g) that does not employ a proxy. For example, the reporting of data 634 and obtaining of rule set changes 636 by the proxy 630 may be performed using the same protocol as the reporting of data 650 and receiving of rule set changes 652 by the individual agent 120g. In some embodiments, to provide the rule set changes 642 to the agents, the agent proxy 630 may present the same communication interface as provided by the machine assessment system 130. Accordingly, from the perspective of the agents 120e and 120f, they can communicate with the proxy 630 in the same way as they communicate with the machine assessment system 130.

In some embodiments, the machine assessment system 130 may control the data collection of agents in the same organization or in the same location together as a group, for example, by automatically tuning a baseline collection rule set shared by the all such agents. For example, the machine assessment system may specify collection of a common set of machine characteristics for all agents in the same organization, owned by the same customer, or located in the same location. In some embodiments, changes to the common set of machine characteristics in the baseline collection may be determined using statistical analysis methods and based on collected data from all agents in the organization, customer, or location. These adjustments may be performed automatically according an auto-tuning policy for the group of agents, without the need for human management.

Figure 7:
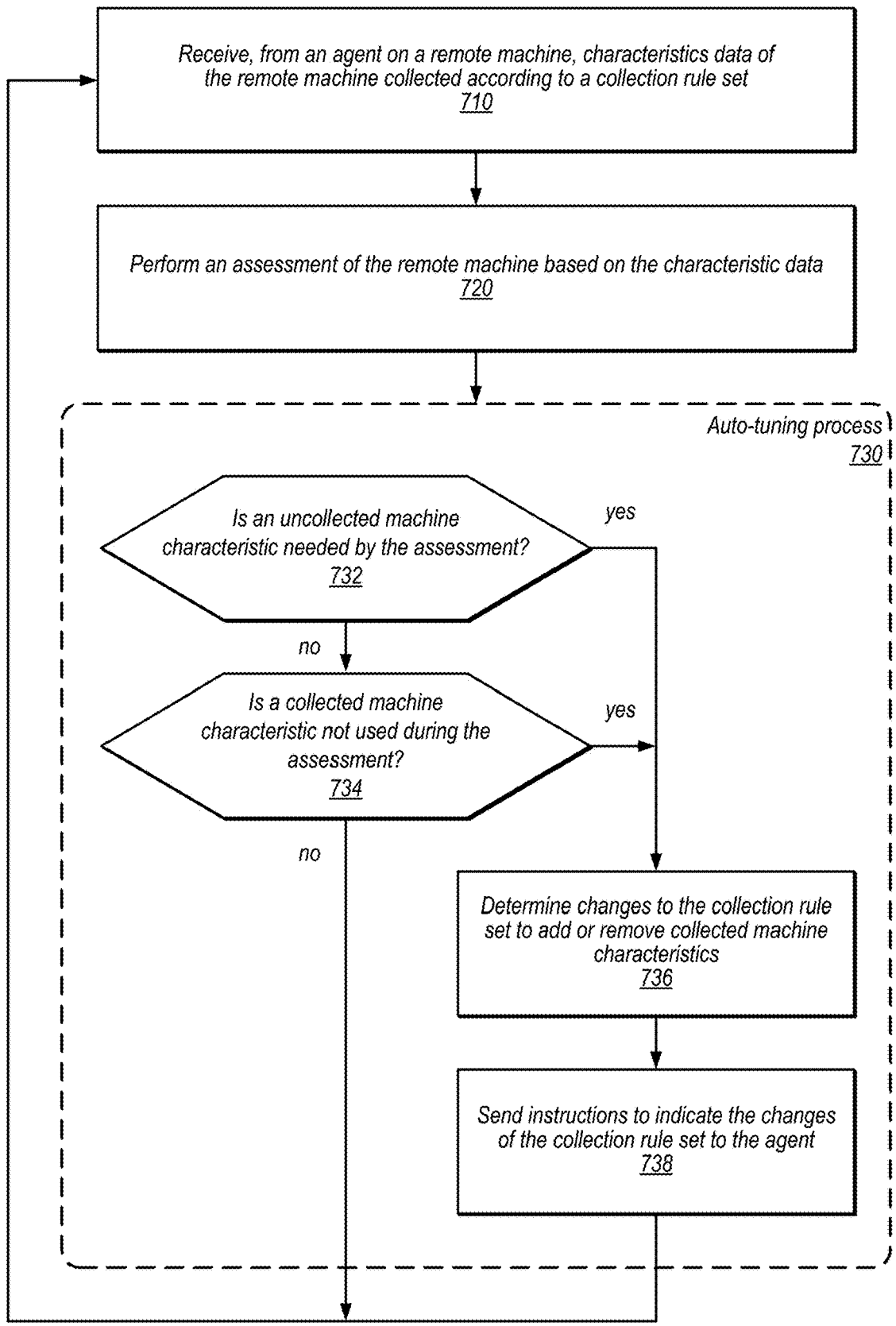
FIG. 7 is a flowchart illustrating a process of auto-tuning a collection rule set for a machine based on assessments of the machine, according to some embodiments.

FIG. 7 is a flowchart illustrating a process of auto-tuning a collection rule set for a machine based on assessments of the machine, according to some embodiments. The depicted process may be performed by a machine assessment system such as the machine assessment system 130 of FIG. 1.

The process begins at operation 710, where characteristics data of a remote machine is received at the machine assessment system. The characteristics data may be machine characteristics 112 of the remote machine, which is collected by an agent (e.g. agent 120) according to a collection rule set (e.g. collection rule set 114). In some embodiments, the agent may store a copy of a collection rule set, which is periodically synchronized with a master copy of the collection rule set maintained by the machine assessment system. Depending on the embodiment, the characteristics data may be reported by the agent periodically or based on certain events, such as configuration or state changes at the remote machine.

At operation 720, an assessment of the remote machine is performed based on the machine characteristics data received. In some embodiments, the machine assessment system may be implemented as a network-accessible service in the cloud, which is configured to receive data from many agents and perform assessments on many machines. The received machine characteristics may be used to build a virtual profile of the remote machine. The assessment system may then examine the virtual profile to look for security vulnerabilities of the remote machines, and recommend one or more actions to mitigate the vulnerabilities.

As shown, operations 732, 734, 736, and 738 may be implemented as part of an auto-tuning process 730, which is used to programmatically adjust the collection rule set of the agent based on the needs of the machine assessment system. The auto-tuning process may be performed by the data collection tuning module 170 of FIG. 1, as discussed.

At operation 732, a determination is made whether an uncollected machine characteristic is needed by the assessment. In some embodiments, the assessment process may leave certain indicators indicating what data field(s) the process used. A different process may then later examine these indicators to determine which data fields or machine characteristics should be added or removed from the agent's data collection. For example, an agent's data collection may initially indicate that a particular application is installed on the remote machine. As a result of this, the auto-tuning process may determine to augment the data collection to include application-specific data about that application.

At operation 734, a determination is made whether a collection machine characteristic is not used during the assessment. In some embodiments, depending on the change policy implemented by the auto-tuning process, a machine characteristic may be retired from the agent's collection rule set either immediately or after several cycles of assessment or collection. In some embodiments, the decision to retire a particular characteristic may be based on other collected data. For example, if it is determined that a particular application is not installed on the remote machine, the auto-tuning process may determine to cease collecting certain machine characteristics for the machine such as what version of that application is installed, the versions of the application's executables and libraries, hashes or fingerprints of the application's executables, libraries, and data files, and configuration data associated with the application. As another example, the auto-tuning process may also instruct the agent to stop looking for particular viruses that depend on that particular application.

If it is determined from operations 732 and 734 that no changes are needed on the collection rule set, the auto-tuning process 730 exits and the process loops back to operation 710 to receive further data from the agent. On the other hand, if either determination of operations 732 or 734 indicates that a change is needed, the process proceeds to operation 736, where the auto-tuning process determines the set of changes to the collection rule set. The changes may be represented as instructions to add or remove machine characteristics to or from the collection rule set. In some embodiments, a set of determined changes may be stored as a version of the collection rule set, for example, in the data collection catalog 172 of FIG. 1.

The process then proceeds to operation 738, where the machine assessment system sends instructions to indicate the determined changes to the agent. In some embodiments, the agent will request the updated collection rule set, and the instructions may simply include the updated collection rule set. In some embodiments, the instructions may be sent as part of the communication protocol between the machine assessment system and the agent, as shown in FIG. 4. In some embodiments, only a delta of the changes is sent to the agents. For example, the machine assessment system may determine that the agent currently has a particular version of the collection rule set, and only send version changes subsequent to that particular version. Once the agent receives the change instructions, the agent will apply the changes to its copy of the collection rule set, and begin collecting and report machine characteristics data according to the updated collection rules. As discussed, the auto-tuning process may continue on an ongoing basis, to automatically adjust the collection rule set of the agents based on the needs of the assessment process, and in response to any changes on the remote machine, without any manual intervention by human administrators.

Figure 8:
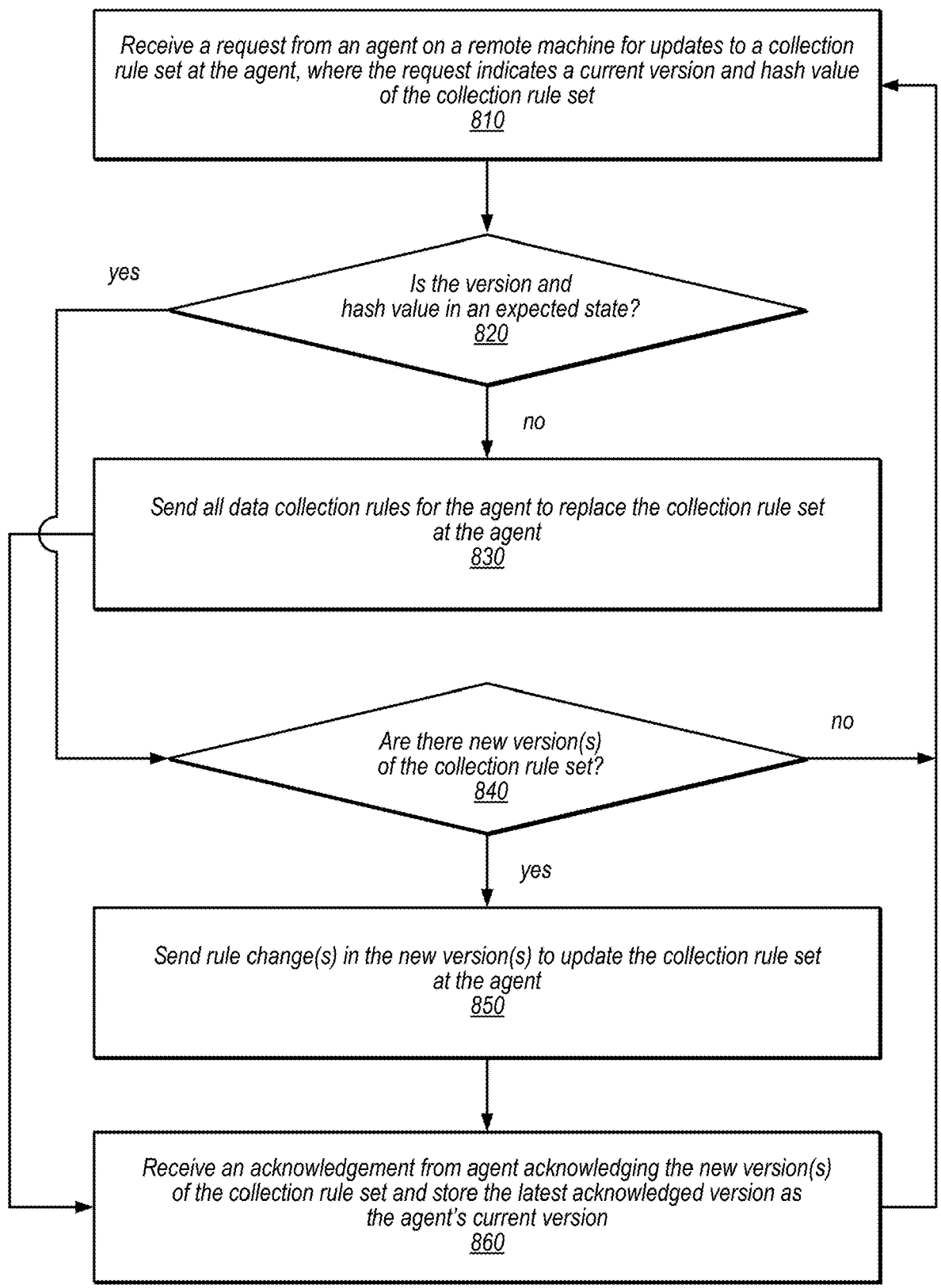
FIG. 8 is a flowchart illustrating a process of synchronizing a collection rule set for a machine between an agent and a machine assessment system, according to some embodiments.

FIG. 8 is a flowchart illustrating a process of synchronizing a collection rule set for a machine between an agent and a machine assessment system, according to some embodiments. The depicted process may be performed by a machine assessment system such as the machine assessment system 130 of FIG. 1, and using the interactions as described in connection with FIG. 4.

At operation 810, a request (e.g. request 420) is received from an agent (e.g. agent 120) for updates to a collection rule set, where the request indicates a current version and hash value of the collection rule set. As discussed, in some embodiments, the machine assessment system may implement a web service that is designed to interface with the agents, to allow the agents to make requests to pull collection rule set changes from the machine assessment system via web service calls. The agent may maintain a current version of its collection rule set and report the version in its requests, to allow the machine assessment system to perform a version check. In some embodiments, the request may include a hash of the agent's current collection rule set. The hash may be computed based on the contents of the current collection rule set and used by the machine assessment system to check whether the collection rule set is in an expected state.

At operation 820, the machine assessment system checks if the current version and hash value reported by the agent is in an expected state (e.g. via the check 422 in FIG. 4). In some embodiments, the machine assessment system may maintain an expected version of the collection rule set at each agent (e.g. the last acknowledged version), and if a reported current version from the agent fails to match the expected version, the machine assessment service may deem the agent to be out-of-sync with the machine assessment system. In some embodiments, the machine assessment system may also check whether the hash value included in the request matches an expected value of the hash value computed from a corresponding version of the master copy of the rule set maintained by the machine assessment system. A mismatch of the two hash values may indicate a corruption of the collection rule set copy maintained by the agent.

If the current version or hash value reported by the agent is not in an expected state, the process proceeds to operation 830. At operation 830, the machine assessment system sends to the agent all data collection rules for the agent in its master copy to replace the existing copy of the collection rule set at the agent (e.g. as shown in operation 446). In some embodiments, the sending of all data collection rules in the master copy may occur only on rare occasions, when an out-of-sync or corruption condition is detected.

If the current version and hash value reported by the agent is in an expected state, the process proceeds to operation 840, where it is determined whether there are new versions of the collection rule set that should be provided to the agent. In some embodiments, the machine assessment system may maintain a version history of the collection rule set for each agent, including any newer versions that have not yet been provided to the agent. If no new versions exist, the collection rule set of the agent is up-to-date, and the process loops back to the beginning. However, if new versions do exist, the process proceeds to operation 850.

At operation 850, any rule changes indicated in the new version(s) of the master copy rule set are sent to the agent to update the agent's copy of the collection rule set (e.g. via response 426 in FIG. 4). The sending of the rule changes will cause the agent to apply the changes to update its collection rule set, so as to change its data collection and reporting scope going forward. After the changes are applied, the agent may compute a new hash value of the updated collection rule set to be sent back in an acknowledgement to the machine assessment system. In some embodiments, the rule changes may be compressed and/or encrypted before it is sent to the agent.

At operation 860, an acknowledgement is received from the agent acknowledging the new version(s) of the collection rule set. The acknowledgement may indicate that the agent has successfully applied the rule set changes. The acknowledgement may indicate the latest version number that the agent was able to successfully apply. In some embodiments, the acknowledgment may also include the new hash that is computed from the updated copy of the agent's collection rule set, after the changes were applied. The machine assessment system may again compare the new hash value included in the acknowledgement with a hash value computed from the latest version of its own master copy, to determine if the agent has correctly synchronized its rule set with the master copy. If not, the machine assessment system may perform operation 830 again, to cause the agent to synchronize again. If the agent's computed hash value matches the master copy's hash value, the machine assessment system may store the latest version reported in the agent's acknowledgement as the agent's current version. At this point, the agent's collection rule set is synchronized with the master copy maintained by the machine assessment system. In some embodiments, the receipt of rule changes at the agent will cause the agent to immediately perform a data collection and report the collected data back to the machine assessment system.

Figure 9:
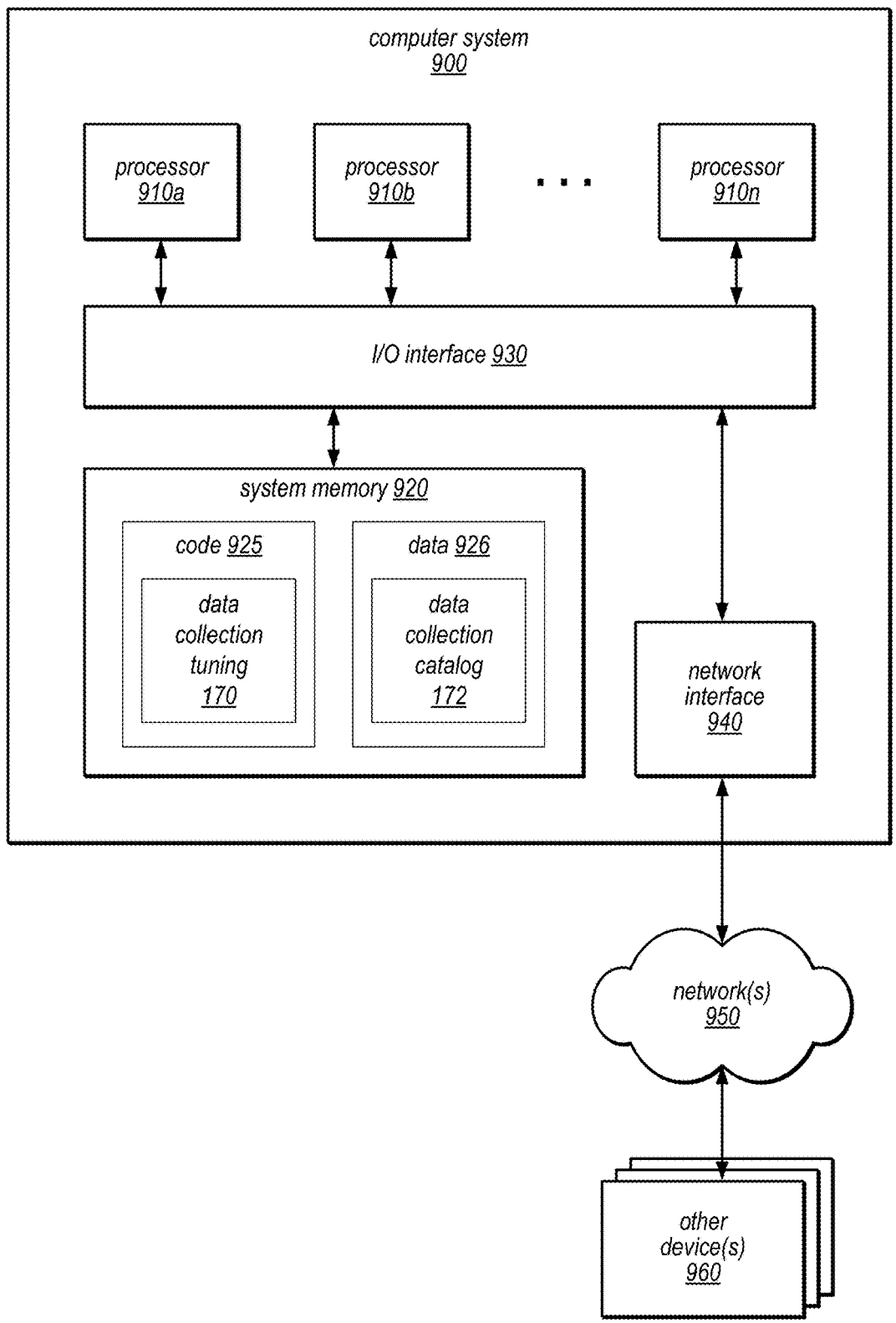
FIG. 9 is a block diagram illustrating an example computer system that can be used to implement one or more portions of a machine assessment system that implements self-learning data collection of machine characteristics, according to some embodiments.

FIG. 9 is a block diagram illustrating an example computer system that can be used to implement one or more portions of a machine assessment system that implements self-learning data collection of machine characteristics, according to some embodiments. For example, the computer system 900 may be a server that implements one or more components of the machine assessment system 130 of FIG. 1.

Computer system 900 may be implemented using a variety of computing devices, such as a personal computer system, desktop computer, laptop or notebook computer, mainframe computer system, handheld computer, workstation, network computer, a consumer device, application server, mobile telephone, or some other type of computing device.

As shown, computer system 900 includes one or more processors 910, which may include multiple cores coupled to a system memory 920 via an input/output (I/O) interface 930. Computer system 900 further includes a network interface 940 coupled to I/O interface 930. In some embodiments, computer system 900 may be a uniprocessor system including one processor 910, or a multiprocessor system including several processors 910a-n, as shown. The processors 910 may be any suitable processors capable of executing instructions. For example, in various embodiments, processors 910 may implement one of a number of instruction set architectures (ISAs), such as the x86, PowerPC, SPARC, or MIPS ISA.

As shown, the computer system 900 may also include one or more network communication devices (e.g., network interface 940) for communicating with other systems and/or components over a communications network. For example, an instance of an application executing on computer system 900 may use network interface 940 to communicate with another server application executing on another computer system, as described herein.

As shown, computer system 900 may use its network interface 940 to communicate with one or more other devices 960, such as persistent storage devices and/or one or more I/O devices. In some embodiments, some of these other devices may be implemented locally on the computer system 900, accessible via the I/O interface 930. In various embodiments, persistent storage devices may include disk drives, tape drives, solid state memory, other mass storage devices, or any other persistent storage device. The computer system 900 may store instructions and/or data in persistent storage devices, and retrieve the stored instruction and/or data as needed.

As shown, the computer system 900 may include one or more system memories 920 that store instructions and data accessible by processor(s) 910. In various embodiments, system memories 920 may be implemented using any suitable memory technology, (e.g., one or more of cache, static random-access memory (SRAM), DRAM, RDRAM, EDO RAM, DDR 10 RAM, synchronous dynamic RAM (SDRAM), EEPROM, non-volatile/Flash-type memory, etc.). The system memory 920 may be used to store code 925 or executable instructions to implement the methods and techniques described herein. For example, the executable instructions may include instructions to implement the data collection tuning module 170, as discussed. The system memory 920 may also be used to store data 926 needed by the executable instructions. For example, the in-memory data 926 may include portions of the data collection catalog 172 for an agent, as discussed.

In some embodiments, some of the code 925 or executable instructions may be persistently stored on the computer system 900 and may have been loaded from external storage media. The persistent storage of the computer system 900 and the external media are examples of non-transitory computer-readable storage media, which may be used to store program instructions to be executed by the computer system 900. A non-transitory computer-readable storage medium may provide the capability to store information in a form readable by a machine (e.g., computer system 900). Non-transitory computer-readable media may include storage media such as magnetic or optical media, disk or DVD/CD-ROM devices, archival tapes, network-attached storage systems, or other computer systems.

In some embodiments, the I/O interface 930 may be configured to coordinate I/O traffic between processor 910, system memory 920 and any peripheral devices in the system, including through network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments, some or all of the functionality of I/O interface 930, such as an interface to system memory 920, may be incorporated directly into processor 910.

In some embodiments, the network interface 940 may allow data to be exchanged between computer system 900 and other devices attached to a network. The network interface 940 may also allow communication between computer system 900 and various I/O devices and/or remote storage systems. Input/output devices may, in some embodiments, include one or more display terminals, keyboards, keypads, touchpads, scanning devices, voice or optical recognition devices, or any other devices suitable for entering or retrieving data by one or more computer systems 900. Multiple input/output devices may be present in computer system 900 or may be distributed on various nodes of a distributed system that includes computer system 900. In some embodiments, similar input/output devices may be separate from computer system 900 and may interact with one or more nodes of a distributed system that includes computer system 900 through a wired or wireless connection, such as over network interface 950. Network interface 940 may commonly support one or more wireless networking protocols (e.g., Wi-Fi/IEEE 802.11, or another wireless networking standard). In some embodiments, the network interface 940 may support communication via telecommunications/telephony networks such as analog voice networks or digital fiber communications networks, via storage area networks such as Fibre Channel SANs, or via any other suitable type of network and/or protocol.

Although the embodiments above have been described in considerable detail, numerous variations and modifications may become apparent to those skilled in the art once the disclosed inventive concepts are fully appreciated. It is intended that the following claims be interpreted to embrace all such variations and modifications, and the above description to be regarded in an illustrative rather than a restrictive sense.

What is claimed is:

1. A system, comprising:
one or more hardware processors with associated memory that implement a machine assessment system, configured to:
receive, via one or more networks and from an agent executing on a remote machine, characteristics data about the remote machine, wherein the characteristics data is collected according to a collection rule set that specifies a set of machine characteristics of the remote machine to collect and report to the machine assessment system;
perform an assessment of the remote machine based at least in part on the characteristic data;
receive a request from the agent for updates to the collection rule set, wherein the request indicates a hash value computed from a current version of the collection rule set maintained by the agent;
automatically, based at least in part on the assessment determine one or more changes to be made to the collection rule set, and determine a next version of the collection rule set;
verify that the hash value matches a corresponding hash value computed from a corresponding version of a master copy of the collection rule set maintained by the machine assessment system;
responsive to the request from the agent and subsequent to verifying that the hash value matches the corresponding hash value computed from the corresponding version of the master copy, send one or more instructions that indicate the one or more changes to the collection rule set to the agent;
receive, subsequent to sending the one or more instructions to the agent, an acknowledgement from the agent indicating an updated hash value computed from the next version of the collection rule set;
determine that the updated hash value in the acknowledgment does not match another hash value computed from the next version of the collection rule set in the master copy; and
responsive to the determination that the updated hash value does not match the other hash value, send the master copy of the collection rule set to the agent.

2. The system of claim 1, wherein:
the set of machine characteristics specified by the collection rule set includes one or more of:
a version of an application or an operating system on the remote machine,
an indication that a particular application is installed or not installed on the remote machine,
an indication that a patch is installed or not installed on the remote machine,
registry contents, registry permissions, or registry metadata on the remote machine,
file contents, file permissions, or file metadata on the remote machine,
a fingerprint of stored contents of the remote machine,
a security configuration setting on the remote machine,
output of a program executed on the remote machine, or
output of a third-party library invoked on the remote machine, and
the assessment determines one or more of:
a vulnerability of the remote machine,
a policy violation of the remote machine,
an existence of a malware or virus on the remote machine, or
one or more actions to perform to mitigate the vulnerability, the policy violation, or the existence of the malware or virus.

3. The system of claim 1, wherein the machine assessment system is implemented as one or more network-accessible services and configured to:
receive respective characteristics data from respective agents executing on remote machines of different entities;
perform respective assessments of the remote machines based at least in part on their respective characteristics data; and
send respective instructions to the respective agents to change respective collection rule sets of the respective agents.

4. The system of claim 1, wherein to determine the one or more changes to be made to the collection rule set, the machine assessment system is configured to:
determine to add a first machine characteristic to the collection rule set; and
determine to remove a second machine characteristic from the collection rule set.

5. The system of claim 4, wherein:
to determine to add the first machine state, the machine data collection system is configured to determine that the first machine characteristic is needed by the assessment; and
to determine to remove the second machine state, the machine data collection system is configured to determine that the second machine characteristic is not used during the assessment.

6. The system of claim 1, wherein the machine assessment system is configured to:
receive respective characteristics data from a plurality of agents executing on a plurality of remote machines of an entity;
perform assessments of the plurality of remote machines based at least in part on their respective characteristics data;
wherein the determination of the one or more changes to be made on the collection rule set for the remote machine is made based least in part on the assessments of the plurality of remote machines of the entity, and
wherein the one or more changes are sent to the plurality of agents on the plurality of remote machines of the entity to update respective collection rule sets maintained by the plurality of agents.

7. The system of claim 6, wherein:
the respective characteristics data from the plurality of agents are received via an agent proxy server associated with the entity, wherein the agent proxy server is configured to collect the respective characteristics data from the plurality of agents, and
the one or more changes to the collection rule sets are sent to the plurality of agents via the agent proxy server, wherein the agent proxy server is configured to cache the one or more changes for the plurality of agents.

8. A method, comprising:
performing, by one or more hardware processors with associated memory that implement a machine assessment system:
receiving, from an agent executing on a remote machine, characteristics data about the remote machine, wherein the characteristics data is collected according to a collection rule set specifies a set of machine characteristics of the remote machine to collect;

performing an assessment of the remote machine based at least in part on the characteristics data;

receive a request from the agent for updates to the collection rule set, wherein the request indicates a hash value computed from a current version of the collection rule set maintained by the agent;

automatically performing, based at least in part on the assessment, determining one or more changes to be made to the collection rule set, and determining a next version of the collection rule set;

verifying that the hash value matches a corresponding hash value computed from a corresponding version of a master copy of the collection rule set maintained by the machine assessment system;

responsive to the request from the agent and subsequent to verifying that the hash value matches the corresponding hash value computed from the corresponding version of the master copy, sending one or more instructions that indicate the one or more changes to the collection rule set to the agent;

receiving, subsequent to sending the one or more instructions to the agent, an acknowledgement from the agent indicating an updated hash value computed from the next version of the collection rule set;

determining that the updated hash value in the acknowledgment does not match another hash value computed from the next version of the collection rule set in the master copy; and responsive to the determination that the updated hash value does not match the other hash value, sending the master copy of the collection rule set to the agent.

9. The method of claim 8, further comprising:
maintaining, by the machine assessment system, the master copy of the collection rule set; and
wherein the one or more instructions cause the agent to synchronize an agent copy of the collection rule set with the master copy.

10. The method of claim 8, wherein determining the one or more changes to be made to the collection rule set comprises:
determining to add a first machine characteristic to the collection rule set; and
determining to remove a second machine characteristic from the collection rule set.

11. The method of claim 10, wherein determining to remove the second machine characteristic from the collection rule set comprises:
determining that the second machine characteristic was not used to assess the remote machine for a specified period of time or for a specified number of assessments.

12. The method of claim 10, wherein determining to add the first machine characteristic to the collection rule set comprises:
determining that the first machines characteristic was needed to respond to a user query about the remote machine.

13. The method of claim 12, wherein determining to remove the second machine characteristic to the collection rule set comprises:
determining that the second machines characteristic was needed to respond to an ongoing user query about the remote machine, and that the ongoing user query has stopped.

14. The method of claim 8, wherein the agent is initially provided with a baseline collection rule set, and further comprising:
performing, by the machine assessment system:
detecting that a machine characteristic that is needed for assessment of the remote machine is removed from the baseline collection rule set; and
responsive to the detection, causing the agent to add the machine characteristic to a copy of the collection rule set maintained by the agent.

15. The method of claim 14, further comprising:
determining the baseline collection rule set for a group of remote machines located at a particular location or operated by a particular entity, based at least in part on a statistical analysis of machine characteristics collected for a plurality of remote machines assessed by the machine assessment system.

16. One or more non-transitory computer-accessible storage media storing program instructions that when executed on or across one or more processors implement at least a portion of a machine assessment system, wherein:
the machine assessment system is configured to:
receive, from an agent executing on a remote machine, characteristics data about the remote machine, wherein the characteristics data is collected according to a collection rule set that specifies a set of machine characteristics of the remote machine to collect, and
perform an assessment of the remote machine based at least in part on the characteristics data,
receive a request from the agent for updates to the collection rule set, wherein the request indicates a hash value computed from a current version of the collection rule set maintained by the agent; and
the program instructions when executed on or across the one or more processors cause the machine assessment system to:
automatically determine one or more changes to be made to the collection rule set based at least in part on the assessment, and determine a next version of the collection rule set;
verify that the hash value matches a corresponding hash value computed from a corresponding version of a master copy of the collection rule set maintained by the machine assessment system;
responsive to the request from the agent and subsequent to verifying that the hash value matches the corresponding hash value computed from the corresponding version of the master copy, send one or more instructions to the agent, wherein the one or more instructions indicate the one or more changes to the collection rule set;
receive, subsequent to sending the one or more instructions to the agent, an acknowledgement from the agent indicating an updated hash value computed from the next version of the collection rule set;
determine that the updated hash value in the acknowledgment does not match another hash value computed from the next version of the collection rule set in the master copy; and
responsive to the determination that the updated hash value does not match the other hash value, send the master copy of the collection rule set to the agent.

17. The one or more non-transitory computer-accessible storage media of claim 16, wherein:

the assessment is performed by an assessment service that is configured to update a data collection catalog for the remote machine, and the program instructions when executed on or across the one or more processors cause the machine assessment system to determine the next version of the collection rule set is based at least in part on the current version of collection rule set maintained by the agent and contents of the data collection catalog for the remote machine.

18. The one or more non-transitory computer-accessible storage media of claim 16, wherein the program instructions when executed on or across the one or more processors cause the machine assessment system to:

track an expected state of a copy of the collection rule set maintained by the agent;

detect that the copy of the collection rule set is in an unexpected state; and responsive to the detection, send the master copy of the collection rule set to the agent to replace the copy of the collection rule set maintained by the agent.

\* \* \* \* \*